(12) United States Patent
Allande et al.

(10) Patent No.: US 6,850,755 B2
(45) Date of Patent: Feb. 1, 2005

(54) TRANSPARENT BILLING AND DISPLAY OF MULTIPLE DIRECTORY NUMBERS IN WIRELESS TELEPHONE SYSTEMS

(75) Inventors: Darren Anthony Allande, St. Charles, IL (US); Penny Lynne Bright, Naperville, IL (US); Karl Andrew Madsen, West Chicago, IL (US); Manickam Shanmugam, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 644 days.

(21) Appl. No.: 09/756,390

(22) Filed: Jan. 8, 2001

(65) Prior Publication Data

US 2002/0090927 A1 Jul. 11, 2002

(51) Int. Cl.[7] .............................................. H04M 11/00
(52) U.S. Cl. .................... 455/406; 455/408; 455/432.1; 455/432.2; 455/433; 379/114.01; 379/121.03; 379/144.01
(58) Field of Search ................................ 455/406, 408, 455/432.1, 432.2, 432.3, 433; 379/114.01, 121.03, 144.01

(56) References Cited

U.S. PATENT DOCUMENTS

| 5,771,282 A | * | 6/1998 | Friedes | .................. | 379/121.03 |
| 5,774,533 A | * | 6/1998 | Patel | ...................... | 379/127.03 |
| 5,819,176 A | | 10/1998 | Rast | ............................ | 455/422 |
| 5,835,856 A | | 11/1998 | Patel | .......................... | 455/406 |
| 6,005,930 A | * | 12/1999 | Baiyor et al. | .......... | 379/211.01 |
| 6,622,016 B1 | * | 9/2003 | Sladek et al. | .......... | 379/201.01 |

FOREIGN PATENT DOCUMENTS

| WO | WO 92/19078 | 10/1992 |
| WO | WO 99/60770 | 11/1999 |
| WO | WO 01/05128 A1 | 1/2001 |

* cited by examiner

*Primary Examiner*—Lee Nguyen
*Assistant Examiner*—Minh D Dao

(57) ABSTRACT

A system and methods for allowing wireless users to make and send calls using a second wireless billing number or "line" assigned to a single wireless telephone advantageously requires no changes to the air interface or messaging protocol between a Mobile Switching Center and the wireless telephone. The second line is provisioned in the HLR. When the wireless telephone registers with a VLR, the HLR inserts the second billing number. When making a call, the user flags that the second line or number is to be billed by adding a predefined set of digits or characters to the called telephone number. The system recognizes the digits and creates appropriate billing records for the second number. When a call is received on the second billing number or line, the system recognizes that the call is destined for the second billing number, and adds the predefined flag digits to the Calling Party Number to be displayed. The user can recognize from the flag digits that the call was received on the second billing number or line.

18 Claims, 9 Drawing Sheets

TRANSPARENT BILLING AND DISPLAY OF MULTIPLE DIRECTORY NUMBERS IN WIRELESS TELEPHONE SYSTEMS

FIELD OF THE INVENTION

This invention relates to wireless telecommunications systems. More particularly, this invention relates to wireless telecommunications systems in which a mobile station may be assigned a plurality of directory numbers, such that calls may be made to or from each directory number with appropriate message accounting and user control and information facilities.

BACKGROUND OF THE INVENTION

Wireless telecommunications systems have enjoyed great acceptance by telecommunications system providers and by telecommunications service customers. A significant number of customers of wireless services use their wireless telephones for multiple functional roles. For example, many wireless customers use a wireless telephone for both business and personal calls. Many customers do not desire to carry two or more wireless telephones, and therefore they use a single telephone for work-related calls, personal calls, and calls associated with any other functional roles they may have.

A problem with using a single telephone for multiple roles is that it is often desirable to separately account for expenses associated with calls for each of these roles. For example, although a customer may use a single telephone for personal and business calls, the customer often desires that business calls be separately accounted for, so that the customer may seek reimbursement from an employer or obtain favorable tax treatment of the expenses. Also, some wireless telephones may be shared by two people, who may wish separate accounting of their calls.

In addition, it is often desirable that calls be handled differently depending on the different roles with which a call may be associated. For example, the customer may desire that business calls be forwarded to a voice messaging system, but personal calls be delivered, during non-working periods. For another example, the customer may desire that personal calls be forwarded or blocked during an important business meeting, but may be willing to accept business calls during the meeting.

Some wireless telecommunications systems, such as the GSM wireless system, allow multiple directory numbers to be assigned to a single wireless telephone or wireless service subscription. However, as these systems historically have been implemented, for outgoing calls, there have been provided no facilities to permit the wireless customer to conveniently direct, on a per-call basis, the particular one of two or more "lines", subscriptions, or billing numbers to which charges for the call should be billed. Similarly, for incoming calls in systems having separate Gateway Mobile Switching Center (GMSC) and Visitor Mobile Switching Center (VMSC) elements (the desirable case in large networks), there have been provided no facilities to separately account for calls destined for various directory or billing numbers assigned to a single wireless telephone. Further, for incoming calls, there have been provided no facilities to separately control the handling (e.g., forwarding, blocking, etc.) of calls destined for various directory or billing numbers.

In addition, there have been provided no means to indicate to a user when an incoming call arrives at a wireless telephone having multiple assigned numbers the particular one of several assigned numbers to which the call was originally directed. This makes it difficult for the subscriber to know, for example, whether an incoming call is a business or personal call. Where a telephone is shared, it is difficult to determine to which user an incoming call is directed.

It is believed that at least one standards body is considering a revision to the GSM standards, under which additional features would be added to wireless telephones, and certain aspects of the standardized signaling protocol between the wireless telephone and the wireless network infrastructure would be changed, to accommodate the assignment and use of two billing numbers with a single wireless phone. It should be noted that there are many tens of millions of customers of wireless telecommunications systems, and each of these already have one or more wireless telephones complying with the existing or prior versions of the standards. Thus, one complication of addressing the disadvantages of existing wireless telecommunications systems by adding features to the telephone and changing the signaling protocol between the telephone and the network infrastructure is that it would be extremely costly to replace or upgrade the installed base of wireless telephones to provide new facilities supporting multiple directory or billing numbers. Even if the wireless customer were not required to directly pay for the replacement or upgrade, significant customer resentment could be expected.

OBJECTS AND SUMMARY OF THE INVENTION

It is therefore an object of the present invention to provide systems and methods for use in conjunction with wireless telecommunications systems which avoid the aforementioned disadvantages of the prior art.

A wireless telecommunications system constructed according to the present invention provides support for multiple billing numbers assigned to a wireless telephone (hereafter, Mobile Station or MS) but advantageously requires no changes to the signaling protocol between the MS and the wireless network infrastructure. An exemplary embodiment supporting two billing numbers is described herein, but the techniques described are readily extendible to support more than two billing numbers.

Prior to making or receiving calls using a second billing number, a network operator must provision the customer's subscription for the second billing number service. At the time a second billing number is provisioned for a subscription, an entry is made in the wireless network's Home Location Register (HLR) for the subscription. The customer is informed of a special code, such as "*2*" which the customer may use to designate that an outgoing call is to be billed to the second billing number, and which may be displayed to the customer to indicate that an incoming call was originally directed to the second billing number. Similar codes may be assigned to additional billing numbers, such as a third or fourth billing numbers in embodiments where such service is provided. The special code or codes may be provisioned on the originating VMSC as office-wide data and would be applied consistently to all users who subscribe to the additional billing number or line services.

From time to time, including on some occasions when a Mobile Station (MS) is turned on in the coverage area of a wireless network, and on some occasions when the MS is brought into the coverage area of the network, and on various other occasions, the MS registers with the network by communicating with a Visitor Location Register (VLR).

The VLR may be associated with a Visitor Mobile Switching Center (VMSC). The VLR reports the registration to the HLR, and the HLR responsively transmits to the VLR information regarding the subscription associated with the MS. The information includes a first or primary billing number in a field designated MSISDN. If a second or "alternate primary" billing number has been provisioned for the subscription, the HLR also transmits the second billing number, which is recorded in the VLR.

To originate an outgoing call to the second billing number, the customer adds the second-billing-number code to the called number. For example, a second-billing-number code, such as "*2*", may be prepended to the called number. The MS transmits a call setup message including the second-billing-number code and the called number to the VMSC. Because the code is simply additional digits added to the called number, the MS need not be modified to support the code, and the MS need not be aware that the call is to be billed to the second billing number. The VMSC recognizes the second-billing-number code and sets up a call into the telephone network using the second billing number stored in the VLR. In addition, the VMSC creates appropriate billing records referencing the second billing number.

Incoming calls to the wireless network arrive at a Gateway Mobile Switching Center (GMSC), to be routed to a VMSC handling calls for the MS to which the call is directed. Calls to second billing numbers are handled in a manner generally similar to conventional GSM call handling, but special provisions are available to accommodate calls to the second billing number. The GMSC sends a message to the HLR informing it of the incoming call (including the called party number), and requests routing information. The HLR determines which VLR is handling calls for the MS and sends a message to that VLR requesting a roaming number assigned by the VLR for use by the network in handling the incoming call. If the HLR determines that the called party number is the second billing number for the MS, the HLR includes a second-billing-number indicator in its message. The VLR responsively transmits the roaming number to the HLR, and the HLR forwards it to the GMSC. Then the GMSC sets up a call to the mobile through the VLR/VMSC using the assigned roaming number.

When the call arrives at the VLR/VMSC, the VLR associates the roaming number with the call instance earlier created responsive to the HLR's request. The VLR recognizes that the call is destined for the second billing number. The signaling protocols used by conventional GSM systems do not accommodate the called party number (CPN) in the call setup message transmitted from the wireless network to the MS, nor do they accommodate a "second-line" or "second-billing-number" indicator. In order to inform the customer that the incoming call was destined for the second billing number, the VLR adds a predefined code to the calling line number information transmitted to the MS. For example, the VLR may prepend a second billing-number code such as "*2*" to the calling party number.

The MS displays the code with the calling line identification information. Because the code is simply additional digits added to the calling party number information, the MS need not be modified in any way to display the code, and need not itself be aware of the code or its meaning. If the calling party number may not be presented (e.g., it was marked "presentation restricted" or was not received), the VLR suppresses the actual calling party number. Instead, the VLR transmits only the second billing number indicator as the calling party number, marking the information "presentation allowed". This enables the mobile station to display the second billing number indicator regardless of whether the calling party number is actually available and may be presented.

Preferably, the second-billing-number codes and formats used for incoming and outgoing calls are identical. In mobile stations that maintain a log of incoming calls and permit users to return an incoming call by selecting a log entry containing a calling party number, use of identical incoming and outgoing second billing number codes advantageously ensures that calls are returned using the line or billing number on which they arrived.

If the called party answers, the VLR/VMSC and the GMSC each preferably create appropriate call detail records for billing purposes (CDRBP). The VLR/VMSC CDRBP records preferably employ the second billing number. The GMSC CDRBP records may employ the second billing number, or may employ the called party number (i.e., the first billing number). Current wireless standards provide that the GMSC receives called party number in an acknowledgement message from the HLR from which message the CDRBP information is derived. However, it is believed that standards bodies are considering or have approved a modification of the acknowledgement message such that the GMSC would be provided with the second billing number.

If the called party does not answer or cannot be reached, the call may be forwarded. The wireless network may use the fact that a call is destined for a second line or billing number determine how to handle a call (e.g., whether to forward the call), and to properly bill calls, or legs thereof, when forwarding occurs. Moreover, the network may differentially forward calls depending on whether the calls were destined for the first or second billing number. For example, each line or billing number preferably has an associated "subscriber not reachable" indicator controllable by the subscriber and independent of the indicator for other lines. After office hours, a user may select the subscriber-not-reachable indicator for the business line. Thereafter, all calls arriving on the user's business line would receive further treatment in accord with the subscriber-not-reachable indicator, while calls arriving on the user's personal line would continue to be delivered. For example, if the call-forward on subscriber-not-reachable service is provisioned for the subscriber's line, then calls arriving on that line when the subscriber-not-reachable indicator is active would be forwarded, e.g., to a voice-mail system. In addition, the mobile station itself may also differentially forward calls depending on whether the calls were destined for the first or second billing number, as indicated by the presence or absence of the billing-number code (e.g. *2*) delivered in the calling party number information.

BRIEF DESCRIPTION OF THE DRAWINGS

These and other features of the invention will be best understood by reference to the following detailed description of a preferred embodiment of the invention, taken in conjunction with the accompanying drawings, in which.

DETAILED DESCRIPTION OF THE PREFERRED EMBODIMENTS

A preferred embodiment of a wireless telecommunications system constructed according to the present invention provides support for multiple billing numbers assigned to a wireless telephone (hereafter, Mobile Station or MS) but advantageously requires no changes to the signaling protocol between the MS and the wireless network infrastructure. Although an embodiment supporting two lines or billing numbers is described herein for exemplary purposes, one of skill in the art will appreciate that the techniques described are readily extendible to support more than two lines or billing numbers. Although subtle distinctions may be made between lines, subscriptions, and billing numbers, such distinctions are generally not helpful in understanding the invention to which this application is directed, and hereafter, unless otherwise specified, it is intended that those terms be interpreted synonymously. Similarly, references to "calls to", "calls directed to", and "calls destined for" a line or billing number are intended to be synonymously interpreted unless otherwise indicated.

Figure 1:
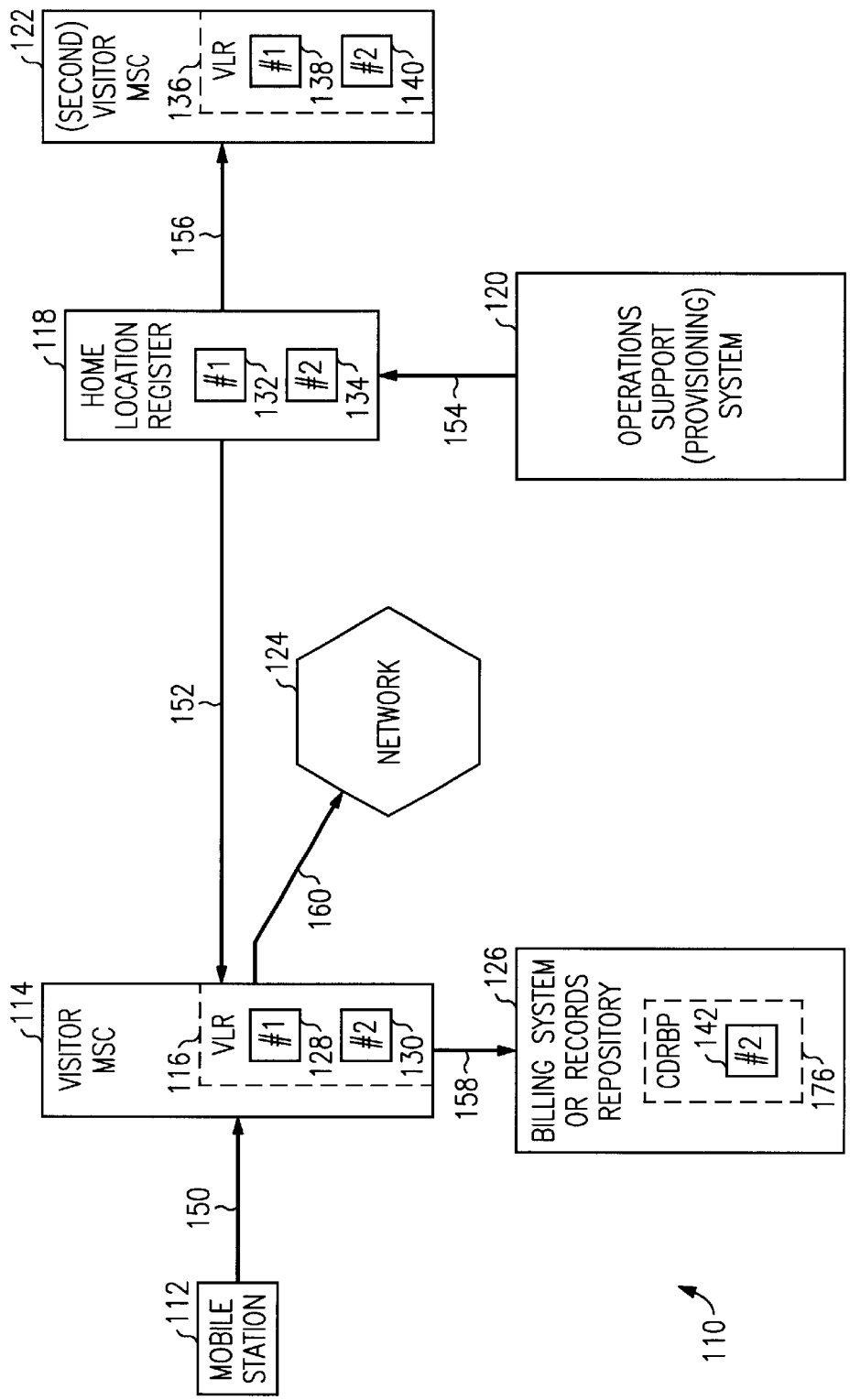
FIG. 1 is a combination block and message-flow diagram showing an arrangement of network elements in a telecommunications network for use in a preferred embodiment constructed according to the present invention for providing dual billing number service, and depicting the handling of an outgoing call.
Figure 2:
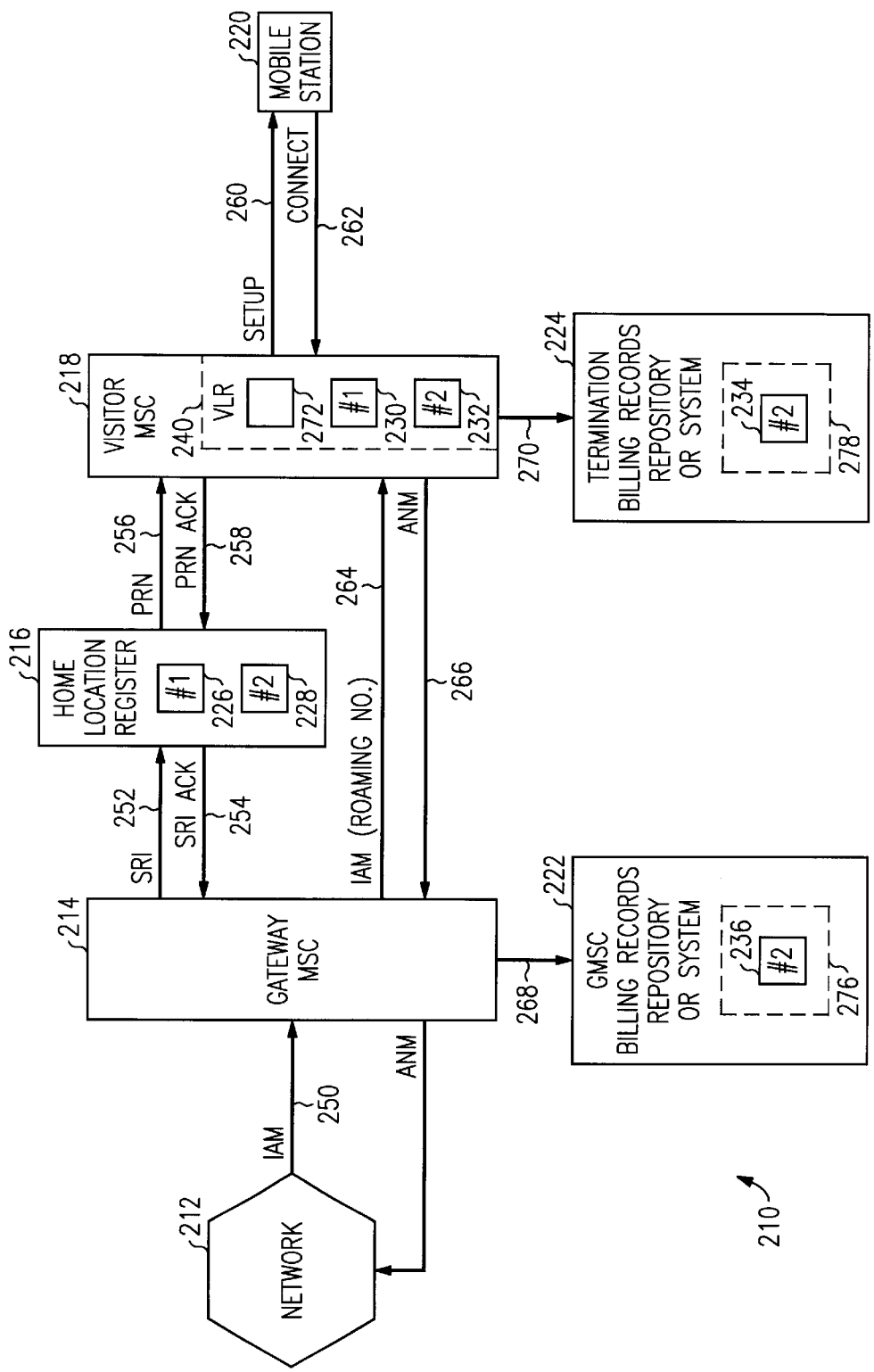
FIG. 2 is a combination block and message flow diagram showing an arrangement of network elements in a telecommunications network for use in a preferred embodiment constructed according to the present invention for providing dual billing number service, and depicting the handling of an incoming call which is to be delivered to the subscriber's mobile station.
Figure 3:
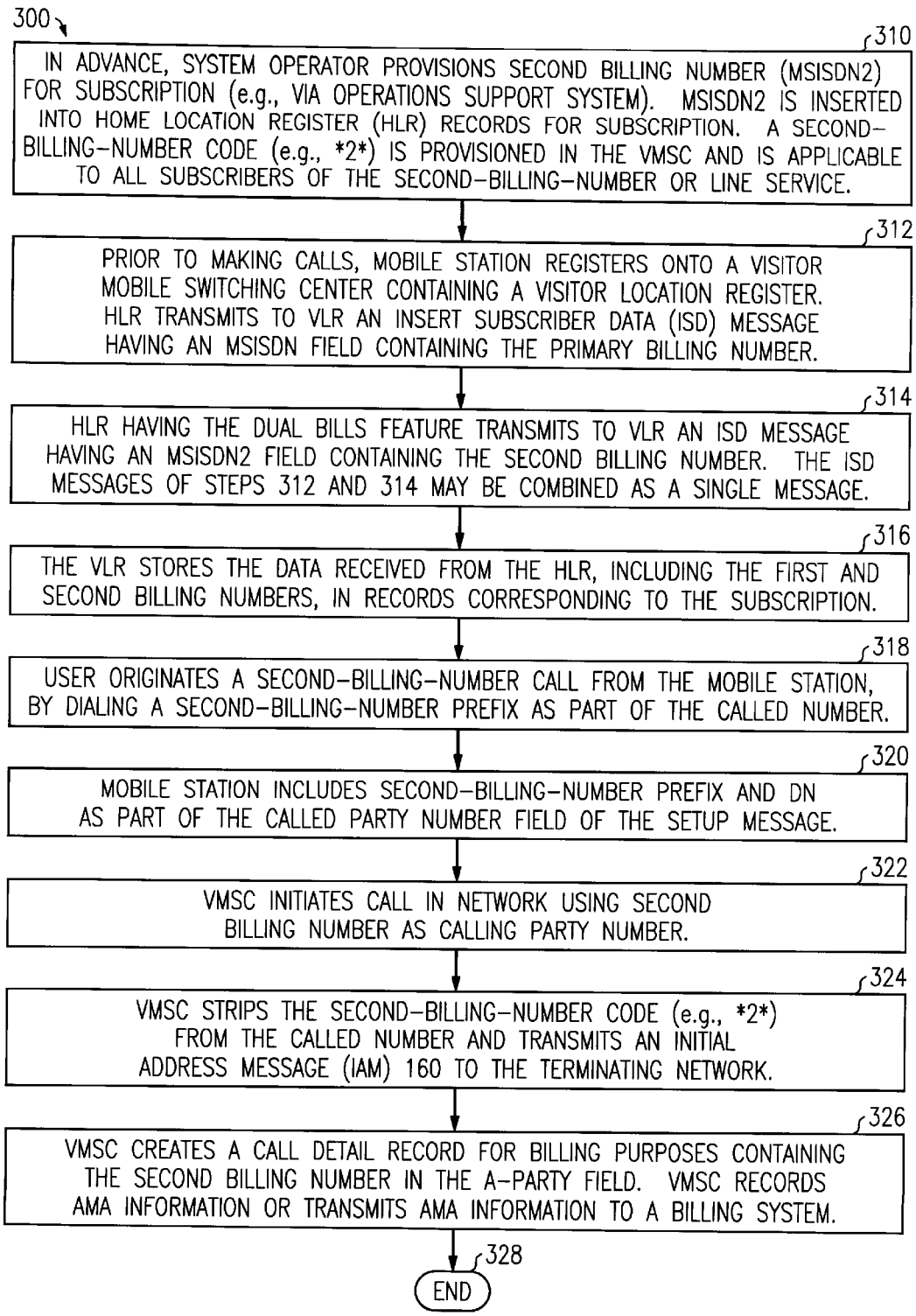
FIG. 3 is a flow diagram showing a method for use in conjunction with the network of FIG. 1 of the present invention for handling an outgoing call.
Figure 7:
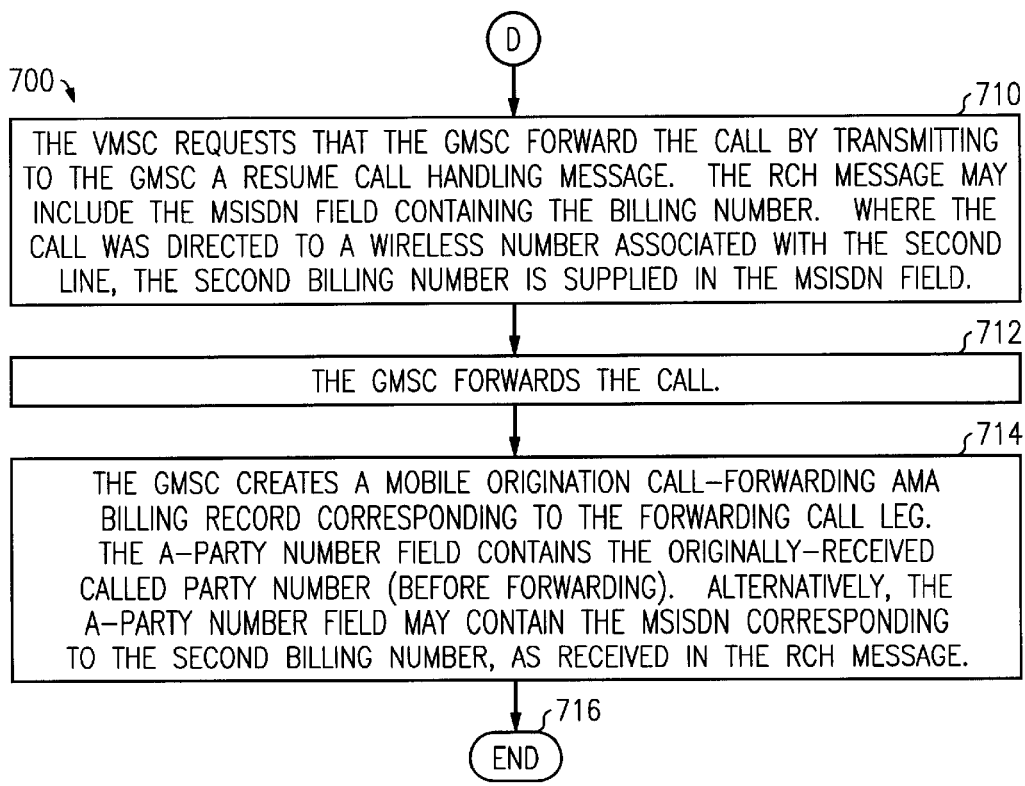
FIG. 7 is a flow diagram showing an alternate method branch for use in conjunction with the network of FIG. 2 and the method of FIGS. 4A and 4B for handling an incoming call when conditional call forwarding by the GMSC is requested.
Figure 8:
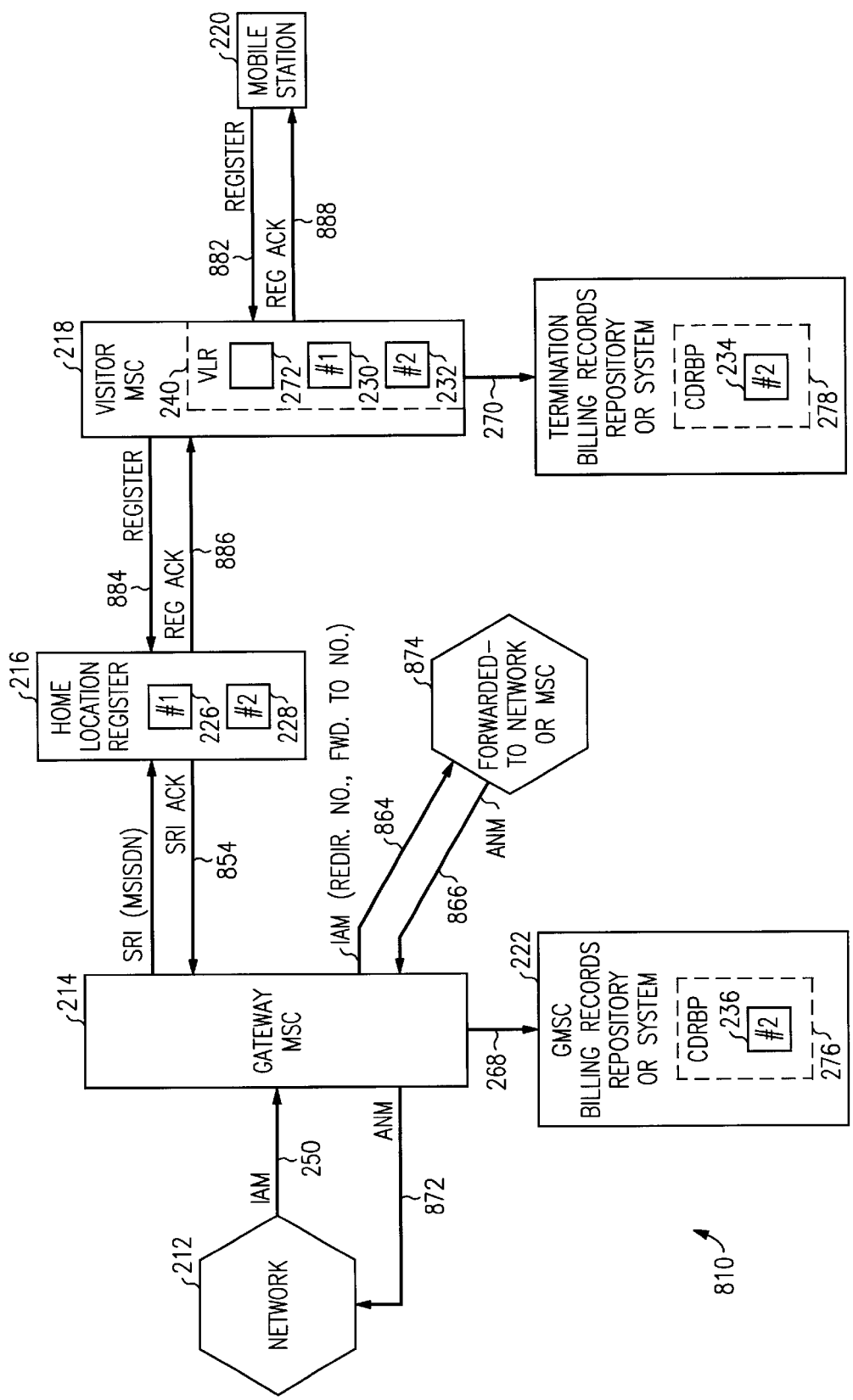
FIG. 8 is a combination block and message flow diagram showing an arrangement of network elements in a telecommunications network for use in a preferred embodiment constructed according to the present invention for providing dual billing number service, and depicting the handling of an incoming call which is not to be delivered to the subscriber's mobile station because the subscriber has activated the subscriber-not-reachable indicator for the line or billing number to which the call is directed.

FIGS. 1, 2, and 8 are combination block and message-flow diagrams showing arrangements of network elements in a telecommunications network for use in a preferred embodiment constructed according to the present invention for providing dual billing number service. FIG. 1 is a combination block and message flow diagram depicting a telecommunications system or network, and in particular, the components 110 of the network implicated in handling an outgoing call. FIG. 2 is a combination block and message flow diagram depicting the components 210 of the network implicated in handling an incoming call when the call is to be delivered to the subscriber's mobile station. FIG. 8 is a combination block and message flow diagram depicting the components of the network implicated in handling of an incoming call which is not to be delivered to the subscriber's mobile station because the subscriber has activated the subscriber-not-reachable indicator for the line or billing number to which the call is directed. FIG. 3 is a flow diagram showing a method 300 for use in conjunction with the network of FIG. 1 for handling an outgoing call. FIGS. 4A, 4B, and 5–7 are flow diagrams showing a method 400 and alternate sub-methods 500, 600 and 700 thereof for handling an incoming call.

The handling of an outgoing call, and those elements common to both incoming and outgoing calls, will be described first, in conjunction with FIG. 1 and 3. A preferred embodiment of the invention is disclosed herein in the context of a GSM network, but one of skill in the art will appreciate that the invention could also be applied to other wireless telecommunications networks, including AMPS, TDMA, CDMA, and others. Network elements, the particular structure or operational behavior of which are not essential to an understanding of the invention are omitted. For example, Base Station Systems and transmission facilities are omitted.

As best seen in FIG. 1, and as known in the art, a wireless telecommunications system 110 may comprise a Mobile Station (MS) 112, a Visitor Mobile Switching Center (VMSC) 114 including a Visitor Location Register (VLR) 116, a Home Location Register (HLR) 118, a second VMSC 122 including a second VLR 136, an operations support or provisioning system 120, and a billing system or billing records repository 126. The remainder of the wireless telecommunications system, and any external networks (e.g., the public switched telephone network), are collectively represented by "network" 124.

Wireless telecommunications systems, and components thereof, are available from a plurality of commercial vendors, and many such systems and components could serve as suitable platforms for implementing an embodiment of the present invention. VMSC 114 and 122 (and VMSC 218 and GMSC 214, to be discussed later), each may be, for example, implemented using a 5ESS® Mobile Switching Center, which is commercially available from Lucent Technologies, 600–700 Mountain Ave., Murray Hill, N.J., 07974. VLRs 116 and 136 (and VLR 240, to be discussed later), each may, for example, be implemented using elements and/or services of a 5ESS® Mobile Switching Center, which is commercially available from Lucent Technologies. HLR 118 and HLR 216 each may, for example, be implemented using elements and/or services of a 5ESS® switch, which is commercially available from Lucent Technologies and which may be applied to operate as a Mobile Switching Center including HLR functions, but may also be applied as a Standalone Home Location Register. These specific products are disclosed by way of example, but not limitation; other products from the aforementioned vendor, and products of other vendors, could also be used. Operations support system 120, billing system 126, and billing systems 222 and 224 (to be discussed later) may be implemented using suitable information processing systems (including appropriate software) as are known in the art and have been used commercially by telecommunications service providers.

In accord with an aspect of the present invention, the subscriber may originate a call and direct that the call be assigned to the second line or billing number. The following discussion describing such an origination refers to the network 110 of FIG. 1, and the method 300 of FIG. 3. Prior to making or receiving calls using a second billing number, a network operator must provision the customer's subscription for the second billing number service. See step 310 (FIG. 3). The provisioning may be performed using an Operations Support System or other provisioning system 120. At the time a second billing number is provisioned for a subscription, for example, using a message 154, an entry is made in the wireless network's Home Location Register (HLR) 118 for the subscription using a second or alternate main billing number field at a location 134 and designated MSISDN2. All HLR subscription records contain a first or main billing number entry at a location 132.

Also as a part of the preparatory step 310, the network operator provisions a special code, such as "*2*", which the customer may use to designate that an outgoing call is to be billed to the second billing number, and which may be displayed to the customer to indicate that an incoming call was originally directed to the second billing number. The customer is informed of the code. The second billing number code is preferably selectable by the network operator or defined by one or more standards applicable to telecommunications networks. Similar codes may be assigned to additional billing numbers, such as a third or fourth billing numbers in embodiments where such service is provided. The special code or codes may be provisioned on the originating VMSC as office-wide data and would be applied consistently to all users who subscribe to the additional billing number or line services on the VMSC. Preferably, the special code or codes are selected to be identical throughout a wireless system or network.

From time to time, including on some occasions when a Mobile Station (MS) is turned on in the coverage area of a wireless network, and on some occasions when the MS is brought into the coverage area of the network, and on various other occasions, the MS registers with the network by communicating with a Visitor Location Register (VLR) such as 116 or 136. See step 312. The communication may occur through a VMSC 114 or 122, which may communicate with the VLR 116 or 136 respectively, to the extent the VLR may not form a portion of the MSC. The particular VLR used typically depends on the location of the MS 112 within the network. In FIG. 1, the MS 112 is nearest a base station (not shown) serviced by VLR 116. The VLR may be associated with a Visitor Mobile Switching Center (VMSC) e.g. 114 or 122 and may be constructed as a standalone network element or may be integrated as a part of the associated VMSC. In step 312, the VLR 116 reports the registration to the HLR 118 in a message (not shown), and the HLR 118 responsively transmits to the VLR 116 an "Insert Subscriber Data" message containing information regarding the subscription associated with the MS. The information includes a first or primary billing number in a field designated MSISDN. In step 314, if a second or "alternate primary" billing number has been provisioned for the subscription, the HLR also transmits the second billing number in an "Insert Subscriber Data" message 152 using a field designated MSISDN2. The ISD messages of steps 312 and 314 may be combined as a single message.

In step 316, the VLR 116 stores the subscriber data, including the first billing number at location 128 and the second billing number at location 130.

In step 318, to originate an outgoing call to the second billing number, the customer adds the second-billing-number code to the called number. For example, a second-billing-number code, such as "*2*", may be prepended to the called number. In step 320, the MS 112 transmits a call setup message 150 including the second-billing-number code and the called number to the VMSC 114. Because the code is simply additional digits added to the called number, the MS 112 need not be modified to support the second-billing-number code, and the MS need not be aware that the call is to be billed to the second billing number. In step 322, the VMSC 114 recognizes the second-billing-number code and sets up a call into the telephone network 124 using the second billing number stored at location 130 in the VLR 116. In step 324, the VMSC strips the second-billing-number code (e.g., *2*) from the called number and transmits an Initial Address Message (IAM) 160 to the terminating network.

In step 326, the VMSC 114 creates appropriate call detail records for billing purposes (CDRBP) 176 including the second billing number 142 in the A-party number (or calling party number) field. The CDRBP records 176 are preferably transmitted as messages 158 to an appropriate repository 126 for billing records. The billing record repository 126 may be implemented as a telecommunications billing system which receives records or transactions in real time. The repository 126 could also be implemented as a file or database on any computer readable medium, such as disk or tape.

The handling of an incoming call in a preferred embodiment of a telecommunications system constructed according to the present invention may be best understood in conjunction with FIGS. 2, 4–7 and 8. FIG. 2 is a combination block and message flow diagram depicting the components of the telecommunications system implicated in handling an incoming call which is to be delivered to the subscriber's mobile station. FIG. 8 is a combination block and message flow diagram depicting the components of the telecommunications system implicated in handling an incoming call which is not to be delivered to the subscriber's mobile station because the subscriber has activated the subscriber-not-reachable indicator for the line or billing number to which the call is directed. Because FIG. 8 is very similar to FIG. 2, FIG. 8 will only be individually discussed in instances in which it differs from FIG. 2.

FIGS. 4A, 4B, and 5-7 are flow diagrams showing a method 400, and alternate sub-methods 500, 600, and 700 thereof, for use in conjunction with the system of FIG. 2 for handling an incoming call. Certain network elements, the particular structure or operational behavior of which are not essential to an understanding of the invention are omitted. For example, Base Station Systems and transmission facilities are omitted. The elements and structure of FIGS. 2 and 8 may be similar to or identical to those of FIG. 1, but are shown in a different arrangement to enhance clarity. One of skill in the art will appreciate that the elements of FIGS. 1 and FIGS. 2 and 8 may simply be different subsets of an entire wireless system.

As best seen in FIGS. 2 and 8, and as known in the art, wireless telecommunications systems 210, 810 may comprise a Gateway Mobile Switching Center (GMSC) 214, a Home Location Register (HLR) 216 in communication with the GMSC 214, a Visitor Mobile Switching Center (VMSC) 218 in communication with the HLR 216, and a mobile station 220 in communication with the VMSC 218. A Visitor Location Register (VLR) 240 may form an integral part of VMSC 218. Alternately, the VLR 240 could also be separate from the VMSC 218, but arranged in communication therewith. FIG. 8 depicts the instance in which a call cannot be delivered to the subscriber terminal and is forwarded, for example, to another network or MSC 874. The remainder of the wireless telecommunications system 210, and any external networks (e.g., the public switched telephone network), are collectively represented by "network" 212. GMSC 214 is in communication with network 124, through which the GMSC 214 may receive incoming calls and may initiate or extend outgoing calls.

GMSC 214 may from time to time generate call detail records for billing purposes (CDRBP) 276 resulting from the calls processed by the GMSC. The GMSC 214 may store the billing records locally on any suitable media, such as disk or tape. Preferably, the GMSC 214 delivers the records 276 via messages 268 to a suitable billing or accounting system, or to a database or repository of call detail and billing records, both represented by box 222. Similarly, VMSC 218 may from time to time generate CDRBP records 278 resulting from the calls processed by the VMSC. The VMSC 218 may store the billing records locally on any suitable media, such as disk or tape. Preferably, the VMSC 218 delivers the records 278 via messages 270 to a suitable billing or accounting system, or to a database or repository of call detail and billing records, both represented by box 224.

Figure 4A:
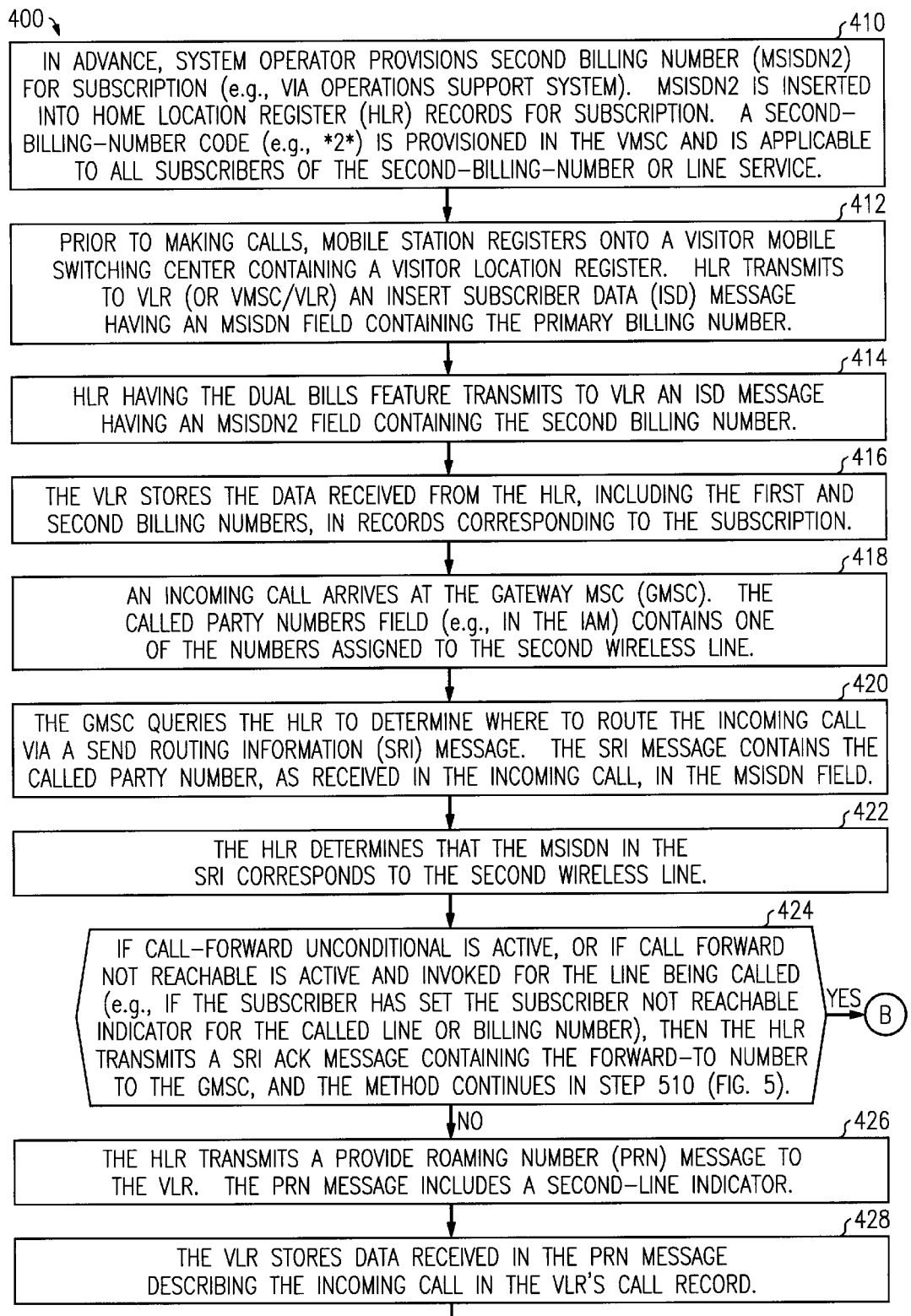
FIGS. 4A, 4B and 4C form a flow diagram showing a method for use in conjunction with the network of FIG. 2 of the present invention for handling an incoming call.

As noted previously in connection with the discussion relating to outgoing calls, prior to making or receiving calls using a second billing number, a network operator must provision the customer's subscription for the second billing number service. This occurs in step 410 (FIG. 4A). At the time a second billing number is provisioned for a subscription, an entry is made in a location 228 of the wireless network's Home Location Register (HLR) 216 for the subscription, using a second or alternate main billing number field designated MSISDN2. All HLR subscription records contain a first or main billing number entry at a location 226.

Also in step 410, a special code, such as "*2*", is provisioned in the VMSC 218 which is used to designate that an outgoing call is to be billed to the second billing number, and which may be displayed to the customer to indicate that an incoming call was originally directed to the second billing number. The customer is informed of the code. The second billing number code is preferably selectable by the network operator. The selected second-billing-number code may be provisioned as office-wide data on the VMSC 218 and be applicable to all subscribers of the second billing number service. The code is preferably selected to be identical throughout a wireless system.

From time to time, including on some occasions when a Mobile Station (MS) is turned on in the coverage area of a wireless network, and on some occasions when the MS is brought into the coverage area of the network, and on various other occasions, the MS registers with the network by communicating with a Visitor Location Register (VLR) such as 240. See step 412. Some registrations may be initiated by the subscriber. For example, the subscriber may enter at the MS a request that one or both billing numbers or lines be marked as "Subscriber Not Reachable", or a request that such condition be cleared. In that case, the MS sends a Register message (e.g., message 882 (FIG. 8)), which may contain unstructured supplementary services data, to indicate that corresponding lines or billing numbers should be marked as "Subscriber Not Reachable", or that the "Subscriber Not Reachable" condition should be cleared for corresponding lines or billing numbers.

The particular VLR used typically depends on the location of the MS 220 within the network. In FIGS. 2 and 8, the MS 220 is nearest a base station (not shown) serviced by VLR 240. The VLR may be associated with a Visitor Mobile Switching Center (VMSC) e.g. 218. The VLR 240 reports the registration to the HLR 216 in a message 884 (FIG. 8).

The HLR 216 performs the registration by storing or updating various information it maintains regarding the subscriber, including subscribed services and billing numbers, e.g., in locations 226 and 228 (FIGS. 2, 8). For example, if the Register message includes a request to mark one of the lines or billing numbers as "not reachable", the HLR 216 may store information to that effect in a corresponding one of the locations 226, 228, or in other storage or database facilities associated with the subscriber, lines, or billing numbers. The HLR 216 acknowledges the registration by transmitting an acknowledgment message 886 to the VLR 240. The VLR responsively transmits an acknowledgement message 888 to the MS 220. For certain features implemented using Register messages, the visitor MSC 218 and/or the VLR 240 need not be specifically equipped to support the feature, because the visitor MSC 218 and VLR 240 may forward the message to the HLR 216 without doing any other substantive work. For example, in the case of the Register message marking a line or billing number as "not reachable", it is not necessary for the visitor MSC 218 and VLR 240 to support the Dual Numbering feature in order to forward to the HLR 216 an appropriate Register message containing unstructured supplementary services data, thereby causing a selected line or billing number to be marked as not reachable.

Also in step 412, the HLR 216 responsively transmits to the VLR 240 an "Insert Subscriber Data" (ISD) message containing information regarding the subscription associated with the MS. The information includes a first or primary billing number in a field designated MSISDN. In step 414, if a second or "alternate primary" billing number has been provisioned for the subscription, the HLR also transmits the second billing number in an "Insert Subscriber Data" (ISD) message (equivalent to message 152, FIG. 1) using a field designated MSISDN2. The information to be transmitted in the ISD messages of steps 412 and 414 may optionally be transmitted in a single ISD message. In step 416, the VLR 240 stores the subscriber data, including the first billing number at location 230 and the second billing number at location 232.

Incoming calls from network 212 destined for mobile stations arrive at Gateway Mobile Switching Center (GMSC) 214. In practice, there may be several GMSCs in a wireless network. Calls to second billing numbers are handled in a manner generally similar to conventional GSM call handling, but special provisions are available to accommodate calls to the second billing number. In step 418, an incoming call from network 212 is announced by an Initial Address Message (IAM) 250. The Called Party Number field (e.g., in the IAM) contains one of the wireless numbers assigned to the second wireless line. Some wireless systems, such as GSM, allow multiple wireless numbers, each corresponding to a different service or bearer capability (e.g., voice, fax, circuit-switched data) to be associated with a single "line" or subscription. In that case, only one of the numbers, and typically the number corresponding to the voice service, is assigned to be the billing number for the "line" or subscription.

The GMSC 214 is responsible for routing the call to a VMSC 218 handling calls for the MS 220 to which the call is directed. Although only one VMSC 218 and VLR 240 are shown in FIG. 2, in a typical wireless system there may be many. In step 420, in order to determine in which, if any, VLR the mobile station is registered, the GMSC sends a Send Routing Information (SRI) message 252 to the HLR 216 informing it of the incoming call (including the called party number), and requesting routing information. The SRI message 252 contains the Called Party Number, as received with the incoming call, in a field designated MSISDN.

In step 422, the HLR 216 determines whether the Called Party Number is the second billing number for the MS (as previously stored at location 228). This information will be used in subsequent steps.

If the called party does not answer or cannot be reached, the call may be forwarded. The forwarding is implemented by steps 424, 432, 442, and 444. The wireless network may use the fact that a call is destined for a second line or billing number determine how to handle a call (e.g., whether to forward the call), and to properly bill calls, or legs thereof, when forwarding occurs. Moreover, the network may differentially forward calls depending on whether the calls were destined for the first or second billing number. For example, each line or billing number preferably has an associated "subscriber not reachable" indicator controllable by the subscriber and independent of the indicator for other lines. After office hours, a user may select the subscriber-not-reachable indicator for the business line. Thereafter, all calls arriving on the user's business line would receive further treatment in accord with the subscriber-not-reachable indicator, while calls arriving on the user's personal line would continue to be delivered. For example, if the call-forward on subscriber-not-reachable service is provisioned for the subscriber's line, then calls arriving on that line when the subscriber-not-reachable indicator is active would be forwarded, e.g., to a voice-mail system. In addition, the mobile station itself may also differentially forward calls depending on whether the calls were destined for the first or second billing number, as indicated by the presence or absence of the billing-number code (e.g. *2*) delivered in the calling party number information.

Figure 5:
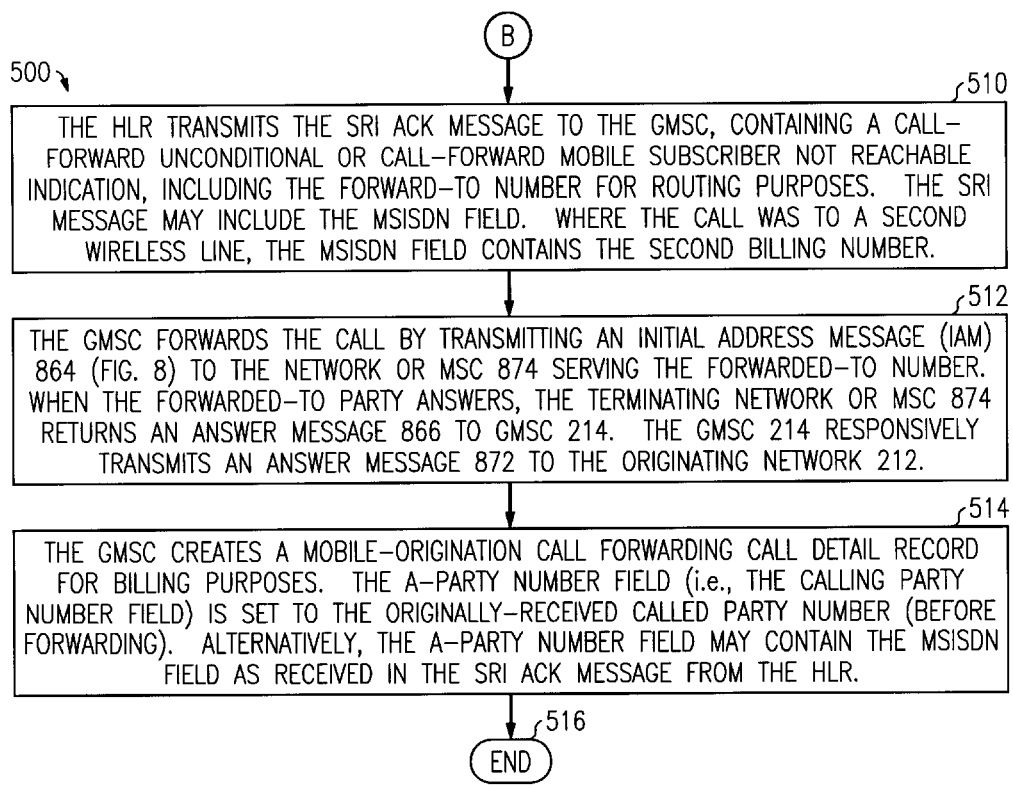
FIG. 5 is a flow diagram showing an alternate method branch for use in conjunction with the network of FIG. 2 and the method of FIGS. 4A and 4B for handling an incoming call when unconditional call forwarding is desired.

In step 424, certain instances of call forwarding are implemented. If Call-Forward Unconditional is active, or if Call Forward Not Reachable is active and invoked for the line being called (e.g., if the subscriber has set the Subscriber Not Reachable indicator for the called line or billing number), then the HLR transmits a SRI Ack message containing the Forward-To Number to the GMSC, and the method continues in step 510 (FIG. 5). If the above-mentioned conditions are not satisfied, then the method continues in step 426.

In step 426, the HLR 216 determines which VLR (e.g. 240) is handling calls for the MS 220 and sends a Provide Roaming Number (PRN) message 256 to that VLR 240 requesting a special roaming number to be assigned by the VLR 240 for use by the network in handling the incoming call. If the Called Party Number is the second billing number, the HLR 216 includes a second-billing-number indicator in the PRN message 256.

In step 428, the VLR 240 stores the data received in the PRN message describing the incoming call in the VLR's call record, including various information about the call at location 272, and a second-billing-number indicator at location 232. In step 430, the VLR 240 responsively assigns a roaming number for use in routing the call, and transmits the roaming number, among other information, in a PRN Acknowledge message 258 to the HLR 216. However, if the VLR 240 determines that the subscriber is not reachable, the VLR 240 instead returns to HLR 216 an error message, e.g., a "PRN Error" message (not shown), indicating that the subscriber is absent.

In step 432 (FIG. 4B), the HLR determines if the wireless customer to whom the call is directed has certain types of forwarding available, and if the call should be forwarded. In particular, if Call Forwarding Not Reachable is active for the line being called and the subscriber is unreachable, then the HLR transmits a SRI ACK message containing the Forward-To Number to the GMSC, and the method continues in step 510 (FIG. 5). The subscriber may be unreachable for reasons unrelated to the Subscriber Not Reachable indicator. For example, the HLR may have received in step 430 an "Absent Subscriber" indication in a PRN Error message from VLR 240. If the conditions for call forwarding are not satisfied, the method continues in step 434.

In step 434, assuming the HLR 118 received a PRN ACK message in step 432, the HLR 118 transmits an SRI Acknowledge message 254 to the GMSC 214, indicating the roaming number to be used for routing the call. If the HLR determined that the Called Party Number was a second billing number, the message 254 may contain the second billing number in the MSISDN field. However, if the HLR 118 received a PRN Error message in step 432, the HLR 118 instead transmits an SRI Error message (not shown) to the GMSC 214. In that case, the GMSC provides normal error treatment to the call, which may include a tone or announcement indicating that the subscriber cannot be reached.

In step 436, the GMSC 214 sets up a call to the mobile 220 through the VLR/VMSC 240, 218 using the assigned roaming number. The GMSC 214 prepares and transmits to the VMSC 218 an Initial Address Message (IAM) 264 setting up the call. The IAM message 264 includes the roaming number earlier provided by the VMSC/VLR 218, 240. In step 438, the GMSC 214 creates one or more appropriate terminating CDRBP records 276 including the original called party number (MSISDN) as received from the HLR in the SRI ACK message 254, in the B-party (or called party number) field 236 of the record. The CDRBP records 276 are preferably transmitted as messages 268 to an appropriate repository 222 for billing records. The billing record repository 222 may be implemented as a telecommunications billing system which receives records or transactions in real time. The repository 222 could also be implemented as a file or database on any computer readable medium, such as disk or tape.

When the call arrives at the VMSC/VLR 218, 240, the VLR 240 associates the roaming number with the call record earlier created responsive to the HLR's request. In step 440, the VMSC 218 transmits a Setup message 260 to the mobile station 220. The signaling protocols used by conventional GSM systems do not accommodate the called party number (CPN) in the call setup message transmitted from the wireless network to the MS, nor do they accommodate a "second-line" or "second-billing-number" indicator. In order to inform the customer that the incoming call was destined for the second billing number, the VLR adds a predefined code to the calling line number information transmitted to the MS. For example, the VLR may prepend a second billing number code such as "*2*" to the calling party number. If the called party subscribes to the Calling Line Identification Presentation (CLIP) service, the Setup message 260 includes the Calling Party Number (CPN) and the second-line indicator. If the called party does not subscribe to the CLIP service, then the second-line indicator is transmitted without the CPN.

The MS displays the code with the calling line identification information. Because the code is simply additional digits added to the calling party number information, the MS need not be modified in any way to display the code, and need not itself be aware of the code or its meaning. If the calling party number may not be presented (e.g., it was marked "presentation restricted" or was not received), the VLR suppresses the actual calling party number. Instead, the VLR transmits only the second billing number indicator as the calling party number, marking the information "presentation allowed". This enables the mobile station to display the second billing number indicator regardless of whether the calling party number is actually available and may be presented.

Preferably, the second-billing-number codes and formats used for incoming and outgoing calls are identical. In mobile stations that maintain a log of incoming calls and permit users to return an incoming call by selecting a log entry containing a calling party number, use of identical incoming and outgoing second billing number codes advantageously ensures that calls are returned using the line or billing number on which they arrived.

If the called party answers, the VLR/VMSC and the GMSC each preferably create appropriate billing records including the second billing number. If the called party cannot be reached (e.g., does not answer, is busy on another call, or the mobile station fails to respond to a page), the call may be forwarded. The wireless network may uses the fact that a call is destined for a second line or billing number to properly bill calls, or legs thereof, when forwarding occurs. Moreover, the network may differentially forward calls depending on whether the calls were destined for the first or second billing number. For example, after office hours, a user may activate and invoke the call forwarding not reachable feature for one of the lines, thereby causing all calls arriving on that line to be forwarded to different predefined number, such as a voice messaging system.

Figure 4B:
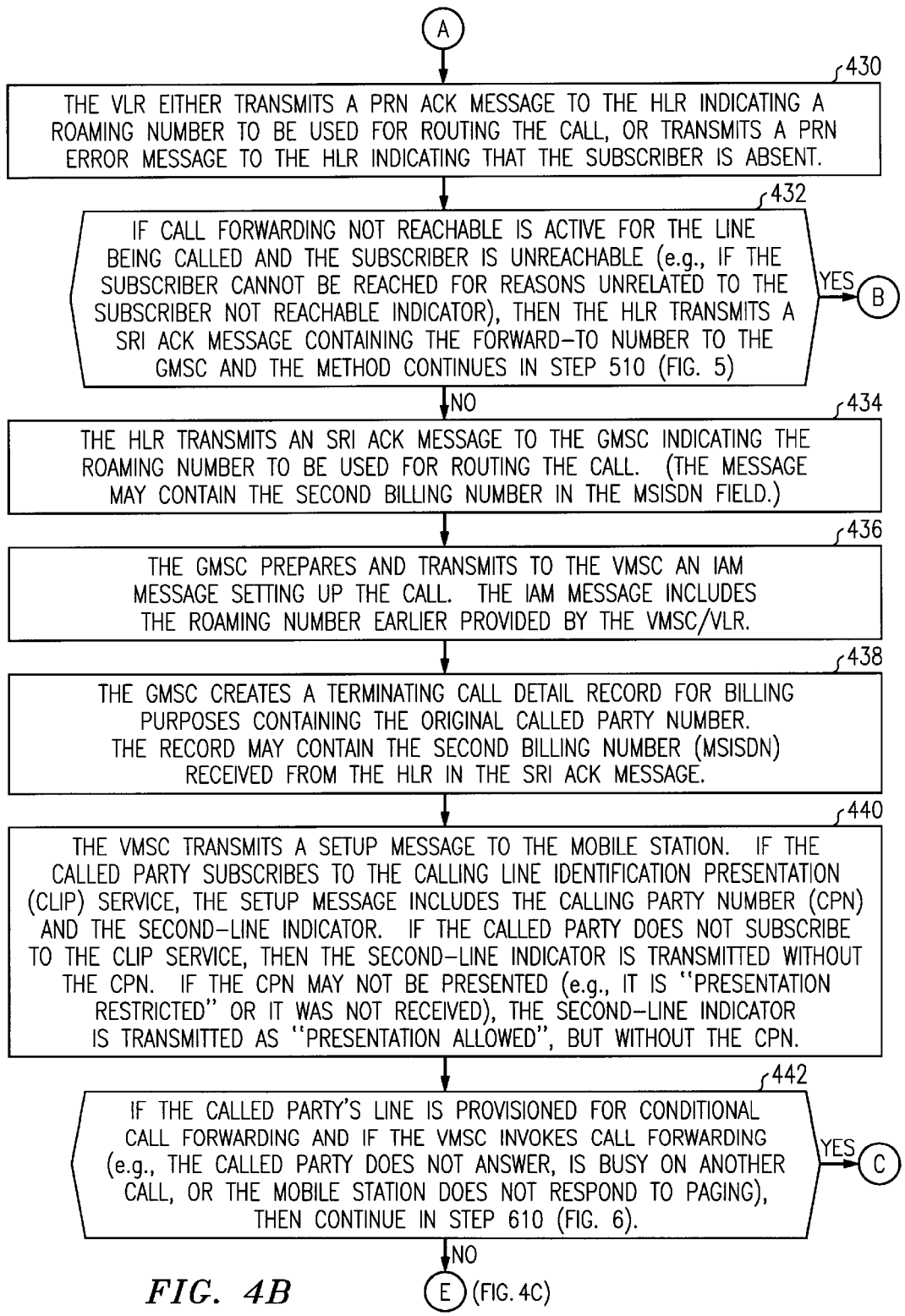
Figure 4C:
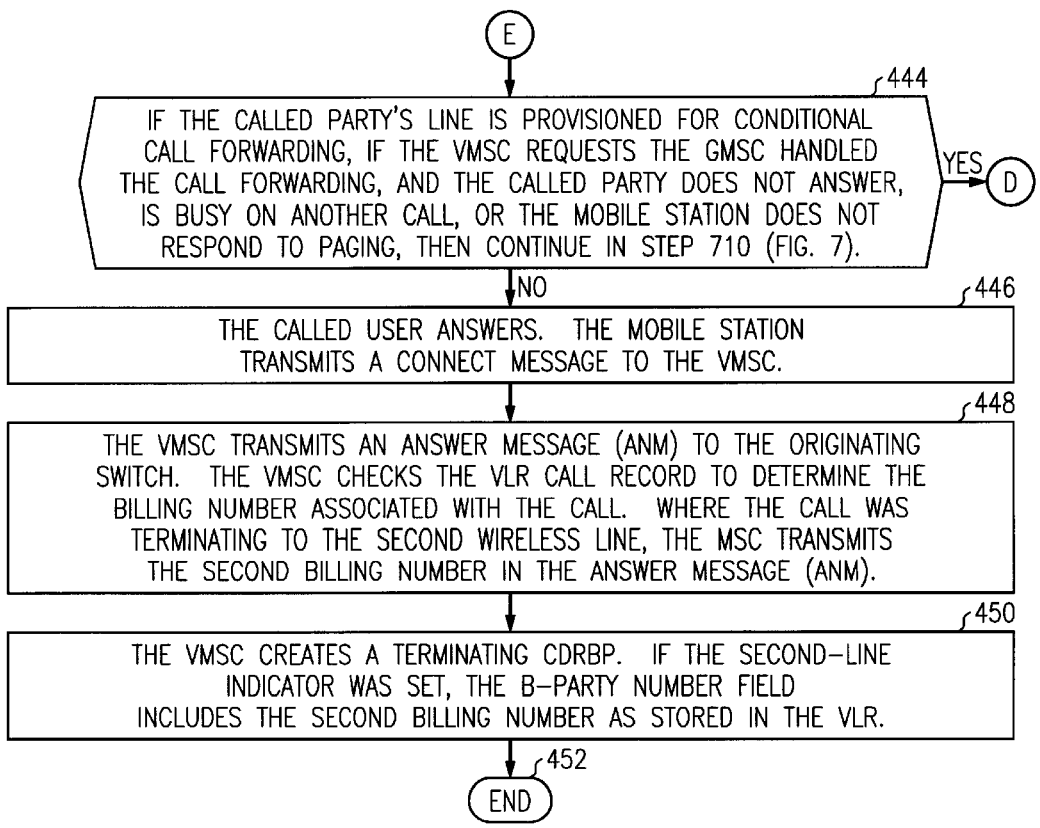

Step 442 is depicted in FIG. 4B as a step executed serially after step 440, but in fact, parts of step 442 must be executed intermingled with parts of steps 440, 444, and 446. In step 442, the VMSC 218 determines whether the called party's line is provisioned for conditional call forwarding, further determines whether conditional call forwarding should be invoked (e.g., the called party fails to answer, is busy on another call, or the mobile station fails to respond to paging), and finally determines whether it is to handle the forwarding. If the line is provisioned for VMSC forwarding, and a forwarding condition is met, then the method continues with step 610 (see FIG. 6, discussed in detail in a later section). Otherwise the method continues in step 444.

Step 444 is depicted in FIG. 4B as a step executed serially after step 442, but in fact, parts of step 444 must be executed intermingled with parts of steps 442, 446, and 448. In step 444, the VMSC 218 determines whether the called party's line is provisioned for conditional call forwarding, further determines whether conditional call forwarding should be invoked (e.g., the called party fails to answer, is busy on another call, or the mobile station fails to respond to paging), and finally determines whether the GMSC is to handle the forwarding. The GMSC may handle the forwarding if the GMSC optimal routing on late call forwarding feature is available to the user. If forwarding condition is met, and the GMSC is to handle the forwarding, then the method continues with step 710 (see FIG. 7, discussed in detail in a later section). Otherwise the method continues in step 446.

In step 446, the called user answers. The mobile station transmits a Connect message 262 to the VMSC 218. In step 448, the VMSC 218 transmits an Answer message (ANM) 266 to the originating switch through the GMSC 214. The VMSC 218 checks the VLR call record (e.g., data items 272, 230, 232) to determine the billing number associated with the call. Where the call was terminating to the second wireless line, the MSC transmits the second billing number 232 as the connected number in the answer message (ANM) 266.

In step 450, the VMSC creates a terminating CDRBP record 278. If the VLR 240 determines that the call is destined for the second billing number, based on the second line indicator at location 232, the B-party number (i.e., the called party number) field includes the second billing number from location 234. The CDRBP records 278 are preferably transmitted as messages 270 to an appropriate repository 224 for billing records. The billing record repository 224 may be implemented as a telecommunications billing system which receives records or transactions in real time. The repository 224 could also be implemented as a file or database on any computer readable medium, such as disk or tape. The method ends at step 452.

FIG. 5 is a flow diagram showing an alternative sub-method 500 which may be executed when the customer has enabled Call Forwarding Unconditional or the subscriber is unreachable. In step 510, the HLR 216 transmits the SRI ACK message 254 to the GMSC 214, containing a Call-Forward Unconditional or Call-Forward Mobile Subscriber Not Reachable indication, including the Forward-To number for routing purposes. The SRI ACK message 254 may include the MSISDN field. Where the call was to a second wireless line, the MSISDN field contains the second billing number 228.

In step 512, the GMSC 214 forwards the call by transmitting an Initial Address Message (IAM) 864 (FIG. 8) to the network or MSC 874 serving the forwarded-to number. The IAM preferably includes the forwarded-to number in the B-party field. The IAM may also include the originally-received Called Party Number in a redirected-number field. Alternatively, if the MSISDN was received in the SRI ACK message 254, the MSISDN may be used in the redirected-number field of IAM 864. When the forwarded-to party answers, the terminating network or MSC 874 returns an answer message 866 to GMSC 214. The GMSC 214 responsively transmits an answer message 872 to the originating network 212.

In step 514, the GMSC 214 creates a mobile-origination call forwarding CDRBP 276. The A-party number field (i.e., the calling party number field) is set to the originally-received Called Party Number (before forwarding). Alternatively, the A-party number field may contain the MSISDN field as received in the SRI ACK 854 message from the HLR 216. The method ends in step 516.

Figure 6:
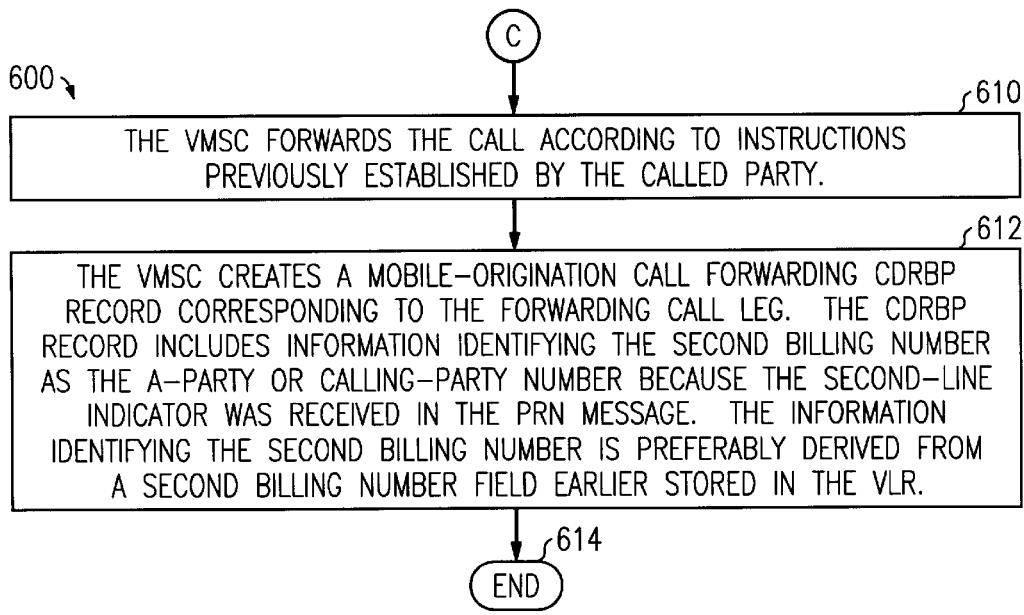
FIG. 6 is a flow diagram showing an alternate method branch for use in conjunction with the network of FIG. 2 and the method of FIGS. 4A and 4B for handling an incoming call when conditional call forwarding by the VLR/VMSC is desired.

FIG. 6 is a flow diagram showing an alternative sub-method 600 which may be executed when the Optimal Routing for Late Call Forwarding feature is provisioned for the terminating subscriber and Conditional Call Forwarding is requested by the VMSC 218. This type of call forwarding may be requested when the subscriber does not answer, or the MS does not respond to pages, or the subscriber is busy on another call. In step 610, the VMSC 218 forwards the call according to instructions previously established by the called party. In step 612, the VMSC creates a mobile-origination call forwarding CDRBP record 278 corresponding to the forwarding call leg and records it or transmits it to an appropriate billing system 224. The CDRBP record 278 includes information 234 identifying the second billing number as the A-party or calling-party number because the second-line indicator was received in the PRN message 256 (FIG. 2). See step 426 (FIG. 4a). The information 234 identifying the second billing number is preferably derived from field 232 (FIGS. 2, 8) earlier stored in VLR 240. See also step 414 (FIG. 4A). The method ends in step 614.

FIG. 7 is a flow diagram showing an alternative sub-method 700 which may be executed when Conditional Call Forwarding by GMSC has been requested by the VMSC as a result of the occurrence of certain call-forwarding trigger conditions. Such conditions may occur, for example, when the subscriber does not answer, the MS does not respond to pages, or the subscriber is on a call. In step 710, the VMSC 218 requests that the GMSC 214 forward the call by transmitting to the GMSC 214 a Resume Call Handling message (not shown). The RCH message may include the MSISDN field containing the billing number. Where the call was directed to a wireless number associated with the second line, the second billing number, previously stored in VLR 240 at location 232, is supplied in the MSISDN field.

In step 712, the GMSC 214 forwards the call according to instructions previously established by the called party. In step 714, the GMSC creates a CDRBP record 276 corresponding to the forwarding call leg. The record is of the mobile origination call-forwarding type, and its A-party number field contains the originally-received called party number (before forwarding). Alternatively, the A-party number field may contain the MSISDN corresponding to the second billing number, as previously stored in VLR 240 at location 232 and received in the RCH message. The method ends at step 716.

The above-described embodiment of the invention is merely one example of a way in which the invention may be carried out. Other ways may also be possible and are within the scope of the following claims defining the invention.

What is claimed is:

1. A method for use with a wireless system for processing a call to a wireless terminal having associated therewith first and second billing numbers, comprising the steps of:

a. storing in said wireless system information associating said second billing number with said terminal;

b. receiving a call and information identifying a called party number to which said call is directed;

c. responsive to said call, retrieving said information associating said second billing number with said terminal and determining that said information identifying a called party number to which said call is directed matches said information associating said second billing number with said terminal; and d. transmitting a call setup message to said terminal, said call setup message including at least a field conventionally used to identify to a user of said terminal a calling party number associated with said call, and said field containing at least a predefined indicia signaling that said call was directed to said second billing number.

2. The method of claim 1 further comprising the step of:

e. creating at least one billing record associated with said call, said record including a representation of said second billing number.

3. The method of claim 1 further comprising the step of:

aa. registering said wireless terminal in a visitor location register of said wireless system; and ab. receiving from said wireless terminal a request to clear for a line associated with said second billing number a previously entered mark of said line as not reachable.

4. The method of claim 1 wherein step c. thereof further comprises the step of:

c1. transmitting a message to a home location register of said system requesting routing information for said call and including a called party number matching said second billing number.

5. The method of claim 4 further comprising the step of:

c2. transmitting a message to a visitor location register of said system requesting a roaming number to be used to extend said call toward said wireless terminal and including an indicia referencing said second billing number.

6. The method of claim 5 further comprising the step of:

c3. receiving from said visitor location register a message containing a roaming number to be used to extend said call toward said wireless terminal, said roaming number corresponding to said second billing number.

7. The method of claim 6 further comprising the step of:

c4. receiving from said home location register a message containing said roaming number corresponding to said second billing number.

8. The method of claim 7 further comprising the step of:

c5. transmitting to said visitor location register a call setup message including said roaming number corresponding to said second billing number.

9. The method of claim 8 further comprising the step of:

c6. responsive to said call setup message including said roaming number corresponding to said second billing number, transmitting to said to said terminal a further call setup message, said further call setup message including at least a field conventionally used to identify to a user of said terminal a calling party number associated with said call, and said field containing at least a predefined indicia signaling that said call was directed to said second billing number.

10. The method of claim 9 further comprising the step of:

c7. said visitor location register creating at least one billing record associated with said call, said record including a representation of said second billing number.

11. A method for use with a wireless system having associated therewith first and second billing numbers, comprising the steps of:

a. storing in said wireless system information associating said second billing number with a wireless terminal;

b. registering said wireless terminal in a visitor location register of said wireless system; and c. receiving from said wireless terminal a request to mark a line associated with said a selected one of said billing numbers as not reachable;

d. receiving a call and information identifying a called party number to which said call is directed;

e. responsive to said call, determining whether said information identifying a called party number corresponds to a billing number associated with a line which has been marked as not reachable; and f. responsive to a determination that said line has been marked as not reachable, executing one of forwarding said call to a predetermined forward-to number and extending said call to said wireless terminal.

12. The method of claim 11 further comprising the steps of:

d. receiving from said wireless terminal a request to clear for a line associated with said selected billing number a previously entered mark of said line as not reachable.

13. A method for use with a wireless system for processing a call from a wireless terminal, said wireless terminal being associated with a subscriber, said subscriber being associated with first and second billing numbers, comprising the steps of:

a. storing in said wireless system information associating said first and second billing numbers with said terminal;

b. receiving from said terminal a request to register said subscriber as not reachable when addressed using a selected one of said first and second billing numbers; and c. said system storing information associated with said selected one of said first and second billing numbers marking said subscriber as not reachable when addressed using said selected one of said first and second billing numbers;

d. receiving a request to establish a call to said subscriber, said request being addressed to one of said first and second billing numbers; and e. determining if said request is addressed to a billing number marked as not reachable.

14. The method of claim 13 further comprising the step of:

f. if said request is addressed to a billing number marked as not reachable, extending said call via a call forwarding operation.

15. The method of claim 13 further comprising the step of:

f. if said request is addressed to a billing number marked as not reachable, providing error treatment to said call.

16. The method of claim 13 further comprising the step of:

f. if said request is not addressed to a billing number marked as not reachable, extending said call through said wireless system to said terminal.

17. The method of claim 13 wherein step c. thereof further comprises the step p of:

c1. a home location register of said wireless system storing information marking said selected one of said first and second billing numbers as not reachable in a record associated with said selected one of said first and second billing numbers.

18. A method for use with a wireless system for processing a call from a wireless terminal, said wireless terminal being associated with a subscriber, said subscriber being associated with first and second billing numbers, comprising the steps of:

a. storing in said wireless system information associating said first and second billing numbers with said terminal;

b. receiving from said terminal a request to register said subscriber as not reachable when addressed using a selected one of said first and second billing numbers; and c. said system storing information associated with said selected one of said first and second billing numbers marking said subscriber as not reachable when addressed using said selected one of said first and second billing numbers;

d. receiving from said terminal a request to clear a previous registration of said subscriber as not reachable when addressed using said selected one of said first and second billing numbers; and e. said system storing information associated with said selected one of said first and second billing numbers so as to clear said marking of said subscriber as not reachable when addressed using said selected one of said first and second billing number.

* * * * *